US009790313B2

(12) United States Patent
Viswanathan et al.

(10) Patent No.: US 9,790,313 B2
(45) Date of Patent: Oct. 17, 2017

(54) CURING COMPOSITIONS AND METHODS OF PREPARING

(71) Applicant: Hexion Inc., Columbus, OH (US)

(72) Inventors: Ganapathy S. Viswanathan, Louisville, KY (US); Craig M. Zirkle, New Salisbury, IN (US)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/831,586

(22) Filed: Aug. 20, 2015

(65) Prior Publication Data

US 2016/0053043 A1    Feb. 25, 2016

Related U.S. Application Data

(60) Provisional application No. 62/040,362, filed on Aug. 21, 2014.

(51) Int. Cl.
| C08G 12/32 | (2006.01) |
| C08G 12/12 | (2006.01) |
| C08L 61/24 | (2006.01) |
| C08L 61/28 | (2006.01) |

(52) U.S. Cl.
CPC ............ *C08G 12/32* (2013.01); *C08G 12/12* (2013.01); *C08L 61/24* (2013.01); *C08L 61/28* (2013.01)

(58) Field of Classification Search
CPC .......... C08L 61/04; C08L 61/06; C08L 61/12; C08L 61/14; C08L 61/20; C08L 61/26; C08L 61/28; C08L 63/00; C08L 63/04; C08L 2666/36; C08K 5/353; C08G 12/32; C08G 12/0852
See application file for complete search history.

(56) References Cited

U.S. PATENT DOCUMENTS

| 3,026,285 A | 3/1962 | Hirosawa et al. |
| 3,131,086 A | 4/1964 | Nyquist et al. |
| 3,468,830 A | 9/1969 | Kiss |
| 3,488,310 A * | 1/1970 | McCombs ............ C08G 12/38 156/331.3 |
| 3,840,495 A | 10/1974 | Balme et al. |
| 4,088,620 A * | 5/1978 | Nihongi ............... C08G 12/266 264/176.1 |
| 4,138,445 A * | 2/1979 | Nogi ....................... C08L 29/04 264/178 F |
| 5,162,049 A | 11/1992 | Bostick et al. |
| 5,215,547 A | 6/1993 | Bostick et al. |
| 5,665,851 A | 9/1997 | Wilhelm et al. |

(Continued)

FOREIGN PATENT DOCUMENTS

| CN | 101265255 A | 9/2008 |
| CN | 102827095 A | 12/2012 |

(Continued)

OTHER PUBLICATIONS

"Thermosets Built to Break Down," Eco Report, VIA C&EN Chemical & Engineering News, May 19, 2014.

*Primary Examiner* — Satya Sastri

(57) ABSTRACT

Disclosed are curing compositions for resin systems and in particular for phenolic resin systems and epoxy resin systems, to methods of preparing the curing compositions and to resin systems incorporating same. The curing compositions of the invention are the reaction product of an aldehyde with an amine in the presence of an aprotic solvent.

9 Claims, 2 Drawing Sheets

(56) References Cited

U.S. PATENT DOCUMENTS

| | | | | |
|---|---|---|---|---|
| 5,998,573 A | * | 12/1999 | Takakura | C08G 12/30 524/100 |
| 9,522,358 B2 | * | 12/2016 | Zhang | B01D 53/02 |
| 2009/0247709 A1 | | 10/2009 | Ishida et al. | |
| 2012/0238653 A1 | | 9/2012 | Horikiri et al. | |
| 2013/0217824 A1 | | 8/2013 | Gupta et al. | |

FOREIGN PATENT DOCUMENTS

| | | |
|---|---|---|
| GB | 795504 | 5/1958 |
| JP | 63-192759 A | 8/1988 |
| JP | 2004/043547 | 2/2004 |
| WO | WO 97/25126 | 7/1997 |
| WO | WO 01/98388 A | 12/2001 |

* cited by examiner

CURING COMPOSITIONS AND METHODS OF PREPARING

RELATED APPLICATION DATA

This application claims benefit to U.S. Provisional Application No. 62/040,362 filed Aug. 21, 2014 of which the entire contents of the application are incorporated by reference herein.

FIELD OF THE INVENTION

The invention relates to curing compositions for resin systems and in particular for phenolic resin systems and epoxy resin systems, to methods of preparing the curing compositions and to resin systems incorporating same. The curing compositions of the invention are the reaction product of an aldehyde with an amine in the presence of an aprotic solvent.

BACKGROUND OF THE ART

There is a need in the art for curing compositions for resin systems, which curing compositions are prepared from inexpensive and readily commercially available raw materials. There is also a need in the art for curing compositions having more functionality, which is expected to provide higher cross-link density, modulus and Tg.

SUMMARY OF THE INVENTION

Figure 1:
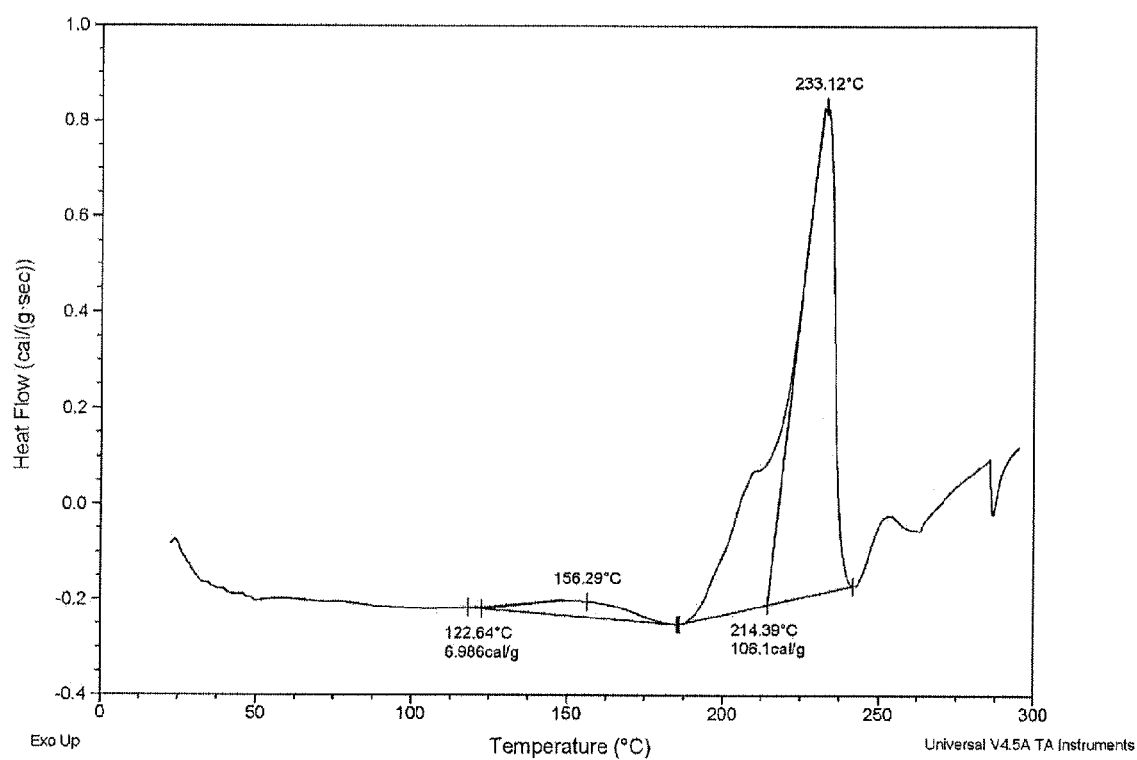
FIG. 1 is a plot of heat flow as a function of temperature illustrating the curing behavior of the intermediate obtained in Example 1.
Figure 2:
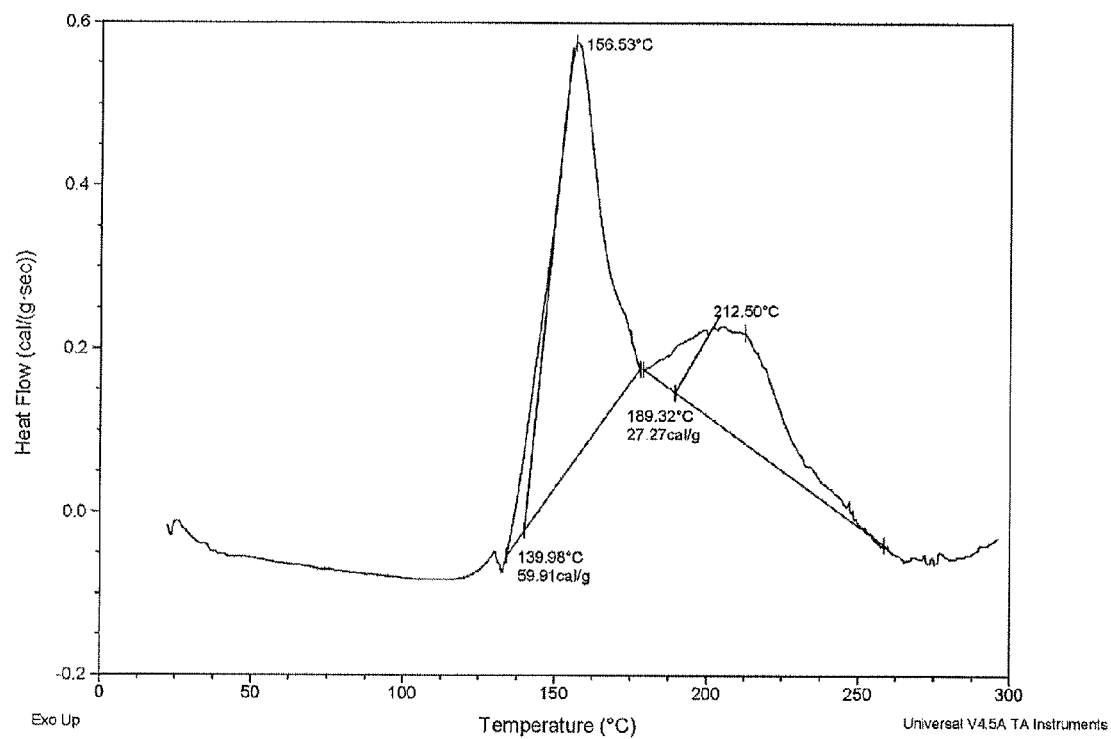
FIG. 2 is a plot of heat flow as a function of temperature illustrating the curing behavior of the intermediate obtained in Example 5.

In one aspect the invention is a curing composition for phenolic resin systems or epoxy resin systems, which curing composition is a reaction product of an aldehyde and an amine which may be an aminotriazine containing at least one free amino group, urea, a derivative of urea containing at least one free amino group, and any combinations or subset thereof.

In another aspect the invention is a curing composition for thermoset phenolic resin systems or thermoset epoxy resin systems, which curing composition is a reaction product of an aldehyde and an amine which may be an aminotriazine containing at least one free amino group, urea, a derivative of urea containing at least one free amino group, and any combinations or subset thereof.

In another aspect the invention is a curing composition for a resin system which is the reaction product of an aldehyde and an amine selected from one or more of an aminotriazine containing at least one free amino group, urea, or a derivative of urea containing at least one free amino group, where the reaction occurs in the presence of an aprotic solvent. In another aspect, the amine includes one or more aminotriazines containing at least one free amino group. In another aspect includes one or more of a 1,3,5-triazine, melamine, a substituted melamine, a guanamine or a derivative of guanaimine. In another aspect the amine includes urea, or a derivative of urea containing at least one free amino group. In another aspect, the amine is melamine or urea or a combination thereof.

In another embodiment, the invention is a method for isolating the curing composition intermediate which includes the step of adding an organic solvent to the reaction product, which organic solvent may or may not be an aprotic solvent, to precipitate the intermediate out of solution. In another embodiment, the method further includes the step of adding water to re-solubilized the intermediate.

DESCRIPTION OF THE PREFERRED EMBODIMENTS

In one embodiment the curing composition of the invention is the reaction product of an aldehyde with an amine in the presence of an aprotic solvent.

In one embodiment, the aldehyde may be an aldehyde added directly or formed in situ. In another embodiment and aldehyde of the formula R—CHO may be used, wherein R is a aliphatic, cycloaliphatic or aromatic moiety. In one embodiment R is a aliphatic, cycloaliphatic or aromatic moiety containing about 1-8 carbon atoms such as acetaldehyde, propionaldehyde, benzaldehyde, furfuraldehyde, paraformaldehyde, the solid low molecular weight polymer of formaldehyde, and the like. In one embodiment the aldehyde is formaldehyde in the solid or aqueous form (formalin). In another embodiment, formaldehyde may be used or formed in situ. In another embodiment, paraformaldehyde, polyoxymethylene, hexamethylenetetramine, or trioxane may be used as a compound to form formaldehyde in situ. In another embodiment, the aldehyde may be a di-functional aldehyde such as for example glyoxal. In one embodiment the curing composition is free of added formaldehyde.

In one embodiment, the amine is an aminotriazine containing at least one free amino group. In one embodiment, the amine is an aminotriazine such as, for example, a 1,3,5-triazine, melamine or a substituted melamine (e.g., an alkylmelamine such as 2-methylmelamine, guanylmelamine), a guanamine or a derivative thereof (e.g., guanamine, methylguanamine, acetoguanamine, benzoguanamine, succinoguanamine and CTU-guanamine).

In one embodiment, the amine is selected from urea, or a derivative of urea containing at least one free amino group.

In one embodiment the amine compound is melamine or urea or a combination thereof.

In one embodiment, the amine compound is not an aniline. In one embodiment the reaction is free of a catalyst.

In one embodiment the solvent may be any aprotic solvent known in the art as not capable of hydrogen bonding, such as, for example perfluorohexane, α,α,α-trifluorotoluene, pentane, hexane, cyclohexane, methylcyclohexane, decalin, dioxane, carbon tetrachloride, freon-11, benzene, toluene, triethyl amine, carbon disulfide, diisopropyl ether, diethyl ether, t-butyl methyl, chloroform, ethyl acetate, 1,2-dimethoxyethane, 2-methoxyethyl ether, tetrahydrofuran, methylene chloride, pyridine, 2-butanone, acetone, hexamethylphosphoramide, N-methylpyrrolidinone (NMP), nitromethane, dimethylformamide, acetonitrile, sulfolane, dimethyl sulfoxide (DMSO), propylene carbonate and the like, including any combination or subset thereof. In another embodiment the aprotic solvent comprises N-methylpyrrolidinone (NMP) or dimethyl sulfoxide (DMSO).

In one embodiment the amine and aldehyde reactants are contacted at a temperature of between about 30° C. and about 80° C. In another embodiment the reactants are contacted for about 30 minutes to 30 hours, or about 30 minutes to about 24 hours or about 30 minutes to about 12 hours or about 30 minutes to about 5 hours. In another embodiment, the reactants are contacted, in an amount such that for every 2 amino groups there are 2.5 to 5 equivalents of aldehyde. In another embodiment, the reactants are contacted in a mole ratio of amine to aldehyde of about 1:3 to about 1:8 or about 1:3 to about 1:6, or about 1:3 to about 1:5, or about 1:4.

The resultant product is expected to be an intermediate, which can be used as a binder or as a co-curative for epoxy and phenolic resins. Subsequently, the intermediate may be subjected to heating to form a hexahydrotriazine system. In one embodiment the intermediate may be subjected to a temperature to initiate a curing mechanism. In another embodiment, the temperature to initiate a curing mechanism is greater than 100° C. In another embodiment the intermediate may undergo polycylcotrimerization with or without the use of a catalyst. In another embodiment, the intermediate is water soluble.

In one embodiment, the curing agent of the invention is prepared in accordance to the following generic reaction scheme:

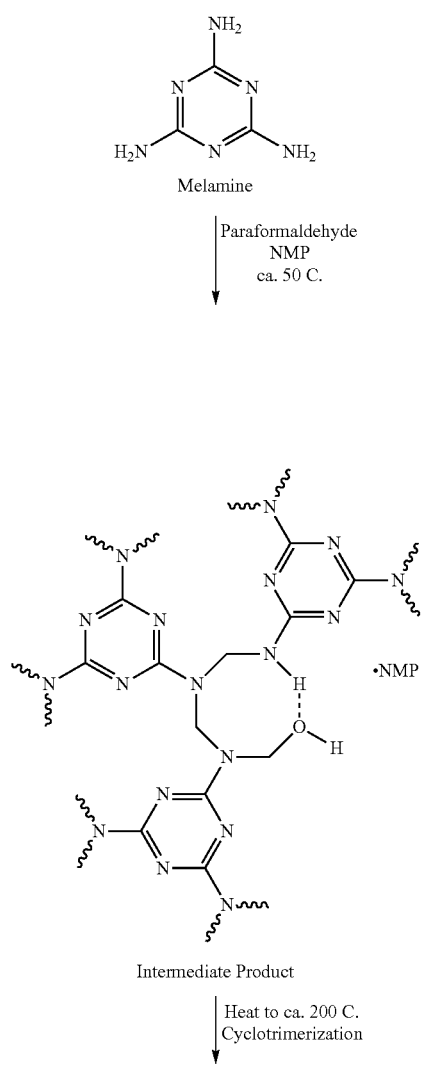

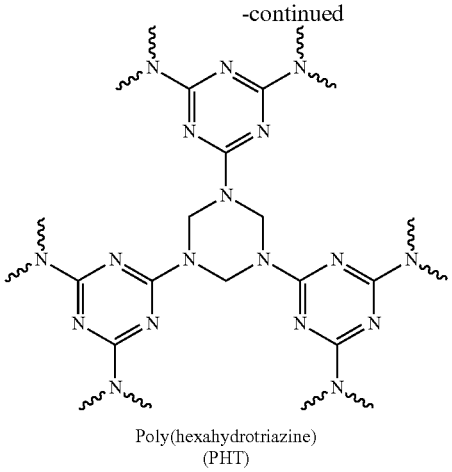

Poly(hexahydrotriazine)
(PHT)

In the above reaction scheme it is understood that the water molecule in the "Intermediate product" is part of the 8 member ring by hydrogen bonding.

In one embodiment, the curing compositions of the invention may be included in resin systems used in a wide variety of applications. For example, in one embodiment, the curing compositions of the invention may be included in resin systems used in the manufacture of structural composites, for example, in the automotive, marine and aerospace industries. In another embodiment, the curing compositions of the invention may be included in resin systems used in the manufacture of electrical laminates, such as used in printed circuit boards. In another embodiment, the curing compositions of the invention may be included in resin systems used in the manufacture of coating compositions. In another embodiment, the curing compositions of the invention may be included in resin systems used in the manufacture of friction materials.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

Example 1

50.0 grams (g) of Dimethyl sulfoxide (DMSO) and 5 g of melamine (0.0396 moles) were charged into a reaction vessel to form a reaction mixture. The reaction mixture was heated to 75° C. and 5.5 g of 92% paraformaldehyde (0.168 moles) was added at once. The reaction mixture was held at 75° C. for 4 hours.

The product was completely soluble in the reaction mixture. Upon addition of an organic solvent (acetone, acetyl nitrile, methanol, ethanol, isopropanol) the product precipitated out of solution. Addition of water re-solubilized the product.

Example 2

50.0 grams (g) of Dimethyl sulfoxide (DMSO) and 5 g benzoguanamine (0.0267 moles) were charged into a reaction vessel to form a reaction mixture. The reaction mixture was heated to 75° C. and 3.7 g of 92% paraformaldehyde (0.113 moles) was added at once. The reaction mixture was held at 75° C. for 4 hours.

The product was completely soluble in the reaction mixture. Upon addition of an organic solvent (acetone, acetyl nitrile, methanol, ethanol, isopropanol) or water the product stays in solution.

Example 3

50.0 grams (g) of N-methyl-2-pyrrolidone (NMP) and 5 g benzoguanamine (0.0267 moles) were charged into a reaction vessel to form a reaction mixture. The reaction mixture was heated to 75° C. and 3.7 g of 92% paraformaldehyde (0.113 moles) was added at once. The reaction mixture was held at 75° C. for 4 hours.

The reaction mixture never solubilized. Upon addition of an organic solvent (acetone, acetyl nitrile, methanol, ethanol, isopropanol) or water the material never dissolved or increased in precipitate.

Example 4

30.0 grams (g) of N-methyl-2-pyrrolidone (NMP) and 30 g 50% aqueous formalin (0.499 moles) were charged into a reaction vessel to form a reaction mixture. The reaction mixture was heated to 75° C. and 15 g melamine (0.119 moles) was added at once. The reaction mixture was held at 75° C. for 20 minutes at which time the solution formed a soft gel.

Example 5

30.0 grams (g) of N-methyl-2-pyrrolidone (NMP) and 30 g 40% aqueous glyoxal (0.207 moles) where charged into a reaction vessel to form a reaction mixture. The reaction mixture was heated to 75° C. and 6.2 g melamine (0.0492 moles) was added at once. The reaction mixture was held at 75° C. for 30 minutes.

The product was completely soluble in the reaction mixture. Upon addition of an organic solvent (acetone, acetyl nitrile, methanol, ethanol, isopropanol) the product precipitated out of solution. Addition of water re-solubilized the product.

Comparative Example 6

30 g 50% aqueous formalin (0.499 moles) was charged into a reaction vessel. The formalin was heated to 75° C. and 6.2 g melamine (0.0492 moles) was added at once. The reaction mixture was held at 75° C. for 5 minutes at which time the solution formed a soft gel.

Comparative Example 7

30 g 40% aqueous glyoxal (0.207 moles) was charged into a reaction vessel. The glyoxal was heated to 75° C. and 6.2 g melamine (0.0492 moles) was added at once. The reaction mixture was held at 75° C. for 15 minutes at which time the solution formed a soft gel.

We claim:

1. A curing composition for a resin system comprising a reaction product consisting essentially of:
   paraformaldehyde;
   melamine; and
   N-methylpyrrolidinone (NMP), and wherein the reaction product is an intermediate product having the structure:

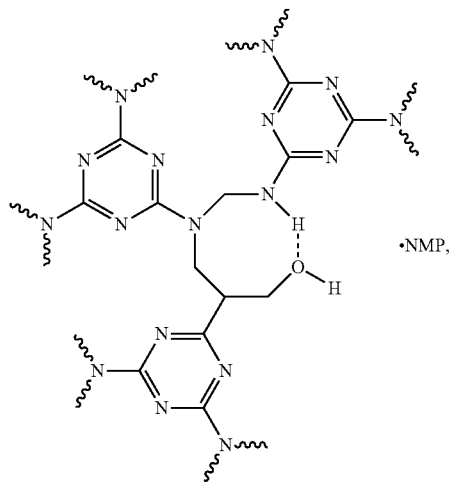

and wherein the melamine: paraformaldehyde mole ratio is from about 1:3 to about 1:8.

2. The curing composition of claim 1, wherein the intermediate product is water soluble.

3. The curing composition of claim 1 wherein the intermediate product is a binder or a co-curative for a resin system.

4. The curing composition of claim 1 wherein the resin system is a thermoset resin system.

5. The curing composition of claim 1 wherein the resin system is an epoxy or a phenolic resin system.

6. The curing composition of claim 1 wherein the melamine: paraformaldehyde mole ratio is from about 1:3 to about 1:6.

7. The curing composition of claim 6 wherein the melamine: paraformaldehyde mole ratio is from about 1:3 to about 1:5.

8. A method for isolating the intermediate product of claim 1 comprising the step of adding an organic solvent to the reaction product, which organic solvent may or may not be an aprotic solvent, to precipitate the intermediate product out of solution.

9. The method of claim 8 further comprising the step of adding water to the intermediate product.

* * * * *